United States Patent [19]
Mori et al.

[11] Patent Number: 4,906,673
[45] Date of Patent: Mar. 6, 1990

[54] POLYURETHANE COMPOSITION

[75] Inventors: Shigeo Mori, Kyoto; Chuzo Isoda, Uji, both of Japan

[73] Assignee: Dai-Ichi Kogyo Seiyaku Co., Ltd., Kyoto, Japan

[21] Appl. No.: 207,823

[22] Filed: Jun. 17, 1988

[30] Foreign Application Priority Data

Jun. 18, 1987 [JP] Japan ................................ 62-151994
Jul. 16, 1987 [JP] Japan ................................ 62-177895

[51] Int. Cl.$^4$ ............................................. C08G 18/14
[52] U.S. Cl. .................... 521/131; 521/132; 521/137; 524/871; 524/875
[58] Field of Search .................... 521/131, 132, 137; 524/871, 875; 525/185

[56] References Cited

U.S. PATENT DOCUMENTS

| 3,252,943 | 5/1966 | Dankert et al. | 260/77.5 |
| 3,454,504 | 7/1969 | Murai et al. | 521/110 |
| 3,580,736 | 5/1971 | Moyer et al. | 117/155 |
| 3,645,945 | 2/1972 | Lesesne et al. | 524/705 |
| 3,773,697 | 11/1973 | Olstowski | 524/775 |
| 3,810,860 | 5/1974 | Doyle | 528/85 |
| 4,011,189 | 3/1977 | Keil | 524/371 |
| 4,210,726 | 7/1980 | Hamamura et al. | 521/110 |
| 4,264,743 | 4/1981 | Maruyama et al. | 521/101 |
| 4,370,445 | 1/1983 | Depetris et al. | 524/742 |
| 4,460,737 | 7/1984 | Evans et al. | 524/584 |
| 4,466,936 | 8/1984 | Shapel | 524/871 |
| 4,762,899 | 8/1988 | Shikinami | 528/49 |

FOREIGN PATENT DOCUMENTS

| 923643 | 4/1963 | United Kingdom | 521/132 |
| 1085037 | 9/1967 | United Kingdom | 521/132 |
| 1125386 | 8/1968 | United Kingdom . | |

*Primary Examiner*—Maurice J. Welsh
*Attorney, Agent, or Firm*—Armstrong, Nikaido, Marmelstein, Kubovcik & Murray

[57] ABSTRACT

A composition capable of providing a polyurethane resin having an improved lipophilic property which comprises an organic polyisocyanate compound, and a polyol component containing a polyether polyol having at least 10% by weight of units of an alkylene oxide having 6 or more carbon atoms, the polyether polyol having an excellent compatibility with an aliphatic hydrocarbon compound or with a hydroxy-terminated diene polymer, its hydrogenation product and a hydroxy-terminated olefin polymer.

5 Claims, No Drawings

POLYURETHANE COMPOSITION

BACKGROUND OF THE INVENTION

The present invention relates to a polyurethane composition, and more particularly to a polyurethane composition having an improved lipophilic property.

Polyurethane resins are prepared by reacting the hydroxyl group of polyols and isocyanate group of polyisocyanate compounds. For instance, polypropylene glycol and polytetramethylene-ether glycol have been used as the polyols, and toluene diisocyanate and 4,4'-diphenylmethane diisocyanate have been used as the polyisocyanates. Catalysts, pigments, foaming agents, silicone surface active agents, and the like have also been used, as occasion demands.

Conventional polyurethane resins have the disadvantage that they are poor in lipophilic property or water resistance. The polyols used are not compatible with aliphatic hydrocarbon compounds, and the obtained polyurethane resins, in other words, products cross-linked with polyisocyanates, are also not compatible with the aliphatic hydrocarbon compounds. Accordingly, it is difficult to conduct the reaction for formation of polyurethane in petroleum oily substances, and the application and development of this technique have been greatly restricted.

Also, in order to improve the lipophilic property or water resistance of polyurethane resins, it is proposed to use polyalkylene polyols, e.g. a hydroxy-terminated polyolefin such as polyethylene or polybutadiene wherein hydroxy substituent groups are introduced into the polymer ends, and a hydrogenation product of a hydroxy-terminated polyolefin having unsaturated bonds in the side chains. However, this technique has the disadvantages that the structure of the polyols is limited in the molecular weight and the number of functional groups, and that the use of additives such as dyes, pigments and catalysts is also limited, and that since the viscosity of these polyols is very high, the workability and the processability are bad and the usages have been remarkably limited, and further that the polyols are expensive because of complicated production steps.

In order to decrease the high viscosity of polyalkylene polyols, it is also proposed to use the polyols in combination with a castor oil-propylene oxide polyol as a viscosity reducer. However, the castor oil-propylene oxide polyol is unstable because of containing ester bond, and may cause a problem when used in the winter because of high melting point. Also, since it is impossible to control the number of functional groups, the application of the obtained polyurethane is limited from the point of physical properties.

The polyalkylene polyols have a further disadvantage that they are poor in compatibility with polyether polyols which have been usually used for the production of polyurethane resins, and even if mixed together, the mixture separates into layers with the lapse of time, thus the desired polyurethane resins are obtained with difficulty.

It is an object of the present invention to eliminate the above-mentioned defects of conventional polyurethane resins.

A further object of the present invention is to provide a polyurethane composition capable of giving a polyurethane resin having an improved lipophilic property.

Another object of the present invention is to provide a polyurethane resin containing aliphatic hydrocarbon compounds.

Still another object of the present invention is to provide a polyurethane composition having excellent processability and workability and capable of giving a polyurethane having an improved water resistance.

These and other objects of the present invention will become apparent from the description hereinafter.

SUMMARY OF THE INVENTION

It has been found that a polyether polyol containing at least 10% by weight of an oxyalkylene group having at least 6 carbon atoms is effective for the production of a polyurethane resin having an improved lipophilic property.

In accordance with the present invention, there is provided a polyurethane composition comprising (1) a polyol component containing at least 20% by weight of a polyether polyol having at least 10% by weight of units of an alkylene oxide having 6 or more carbon atoms, and (2) an organic polyisocyanate compound.

DETAILED DESCRIPTION

The polyether polyol containing at least 10% by weight of units of an alkylene oxide having 6 or more carbon atoms is prepared, for instance, by subjecting an alkylene oxide having at least 6 carbon atoms or a mixture thereof with other alkylene oxide to an addition polymerization to an active hydrogen-containing compound in the presence of a catalyst, and purifying the product to remove the catalyst in a generally known purification manner such as an ion exchange method, a neutralization-filtration method or an adsorption method. The polyether polyol containing at least 20% by weight of units of an alkylene oxide having 6 or more carbon atoms is preferred. Also, preferably the molecular weight of the above polyether polyol is from 500 to 20,000, especially 500 to 7,000.

The active hydrogen-containing compounds used in the preparation of the above polyether polyol are those having at least 2 active hydrogen atoms. Representative examples of such compounds are, for instance, a polyhydric alcohol such as ethylene glycol, propylene glycol, 1,4-butanediol, glycerol, trimethylolpropane, sorbitol or sucrose; an amine compound such as monoethanolamine, ethylenediamine, diethylenetriamine, 2-ethylhexylamine or hexamethylenediamine; and a phenolic compound such as bisphenol A or hydroquinone.

The alkylene oxides having at least 6 carbon atoms used in the present invention are usually those having 6 to 28 carbon atoms. Representative examples of the alkylene oxide having at least 6 carbon atoms are, for instance, hexane oxide, cyclohexane oxide, nonene oxide, and an α-olefin oxide having 12 to 28 carbon atoms.

The alkylene oxide having at least 6 carbon atoms may be used alone or in combination with other alkylene oxides. Alkylene oxides having 5 or less carbon atoms, especially alkylene oxides which have been generally used, are used as other alkylene oxides, e.g. ethylene oxide, propylene oxide and butylene oxide.

In the addition polymerization of these alkylene oxides, they can be added in an arbitrary order.

A basic catalyst such as sodium methylate, sodium hydroxide, potassium hydroxide or lithium carbonate is generally used as a catalyst in the preparation of the polyether polyol. An acidic catalyst such as boron trifluoride and an amine catalyst such as trimethylamine or triethylamine are also useful.

The above-mentioned polyether polyol containing an oxyalkylene unit having at least 6 carbon atoms may be used alone or in admixture with other polyols in the present invention as the polyol component to be reacted with the polyisocyanate compound. In case of using a polyol mixture, it is preferable that the content of the polyether polyol containing an oxyalkylene unit having at least 6 carbon atoms is at least 20% by weight, especially 40% by weight, from the viewpoint of the lipophilic property of the obtained polyurethane resins.

The organic polyisocyanate compound used in the present invention includes aromatic polyisocyanates, aliphatic polyisocyanates and alicyclic polyisocyanates. Representative examples of the polyisocyanate compound are, for instance, 2,4-toluene diisocyanate, 2,6-toluene diisocyanate, 4,4'-diphenylmethane diisocyanate, hexamethylene diisocyanate, and isophorone diisocyanate. The polyisocyanate compounds may be used alone or in admixture thereof. The polyisocyanate compounds are used generally in an amount of about 0.5 to about 5.0 equivalents, especially about 0.8 to about 2.0 equivalents, per equivalent of the polyol component (a ratio of NCO group to active hydrogen atom of the polyol component of 0.5–5.0:1, especially 0.8–2.0:1 by equivalent).

The composition of the present invention may contain a usual catalyst used for the reaction of a polyol and a polyisocyanate. Examples of the catalyst are, for instance, an amine catalyst such as triethylamine, dimethylethanolamine or triethylenediamine, a metallic catalyst such as zinc octylate, tin octylate or dibutyl tin dilaurate, and the like. The composition may also contain other usual additives, as occasion demands.

Also, it is possible to produce a foamed polyurethane from the composition of the present invention by using a blowing agent such as trichloromonofluoromethane or methylenedichloride, or a foaming agent such as water or a silicone surfactant.

The composition of the present invention can be prepared, according to the purposes, into either a one-package type or a two-package type consisting of a polyol component to which additives are usually added as occasion demands, and a polyisocyanate component.

The polyurethane resins prepared according to the present invention have an excellent compatibility with aliphatic hydrocarbon compounds, and it is possible to easily conduct the reaction of the polyol component and the polyisocyanate compound in the presence of aliphatic hydrocarbon compounds.

Accordingly, in one of the aspects of the present invention, there is provided a polyurethane resin composition containing an aliphatic hydrocarbon compound obtained by subjecting a mixture to a reaction, said mixture comprising:
(A) a polyether polyol having at least 10% by weight of units of an alkylene oxide having 6 or more carbon atoms, or a polyol mixture of said polyether polyol and other polyether polyol,
(B) an organic polyisocyanate compound, and
(C) an aliphatic hydrocarbon compound.

According to the present invention, it is possible to form a polyurethane resin in the state that the aliphatic hydrocarbon compound is substantially included in the formed resin. The hydrocarbon compound is occluded in the formed polyurethane resin and does not bleed or ooze out from the reaction product, thus the composition of the invention is stable. Also, since a water resistance is imparted to the polyurethane resin, the composition of the invention exhibits an excellent performance in this respect. Also, the hydrocarbon compound itself serves as an internal releasing agent and the release of formed polyurethane resin composition from a mold is easy. Accordingly, a small amount of the hydrocarbon compound such as paraffin wax can be incorporated as a releasing agent without causing bleeding of the wax from the molded articles.

In this embodiment, as the polyol component, the polyether polyol having units of a $C_6$ or higher alkylene oxide can be used alone or in combination with other polyether polyols, e.g. polyoxyalkylene polyols prepared in the same manner as above using alkylene oxides having 5 or less carbon atoms. Other polyether polyols are used in an amount such that the lipophilic property is not substantially impairied.

Representative examples of the aliphatic hydrocarbon compound are, for instance, a petroleum fraction such as hexane, octane, kerosene, gas oil or diesel oil, liquid paraffin or paraffin wax; a polyethylene wax; an α-olefin polymer; an oily oligomer such as liquid polybutadiene; and other hydrocarbon oils, waxes and polymers which have been used as extenders or improvers for polyurethane resins. The aliphatic hydrocarbon compounds may contain a small amount of aromatic hydrocarbon compounds.

The amount of the aliphatic hydrocarbon compound is from 1 to 1,500 parts by weight, preferably 50 to 1,100 parts by weight, per 100 parts by weight of the polyol component.

It is possible to incorporate a very large amount of the hydrocarbon compound. In that case, the product is useful, for instance, as a pocket or solid fuel.

According to another aspect of the present invention, it is possible to obtain a polyurethane resin molded article having improved water resistance and chemical resistance with excellent fluidity and moldability of the composition. Thus, the present invention also provides a composition comprising:
(a) a polyether polyol having at least 10% by weight of units of an alkylene oxide having 6 or more carbon atoms,
(b) a polyalkylene polyol composed of a saturated or unsaturated aliphatic main chain, and
(c) an organic polyisocyanate compound.

Hydroxy-terminated olefin or diene polymers and hydrogenation products of the hydroxy-terminated diene polymers are used as the polyalkylene polyol (b). Representative examples of the polyalkylene polyol (b) are, for instance, a polybutadiene having hydroxyl groups at its chain ends wherein the butadiene units in the polymer chain is composed mainly of 1,4-bonding units (e.g. those commercially available under the trademark "Poly bd" R-45HT, "Poly bd" R-45M and "Poly bd" CS-15 made by ARCO CHEMICAL CO., LTD.), or wherein the butadiene units is composed mainly of 1,2-bonding units (e.g. those commercially available under the trademark "NISSO-PBG" made by Nippon Soda Co., Ltd.), a hydrogenation product of the above-mentioned polybutadiene, and a polyolefin polyol.

Preferably, the polyalkylene polyol (b) is used in an amount of 10 to 80% by weight based on the total weight of the polyol component.

In this embodiment, a mixture of the polyether polyol (a) having a $C_6$ or higher oxyalkylene units and the polyalkylene polyol (b) is used as the polyol component. However, polyether polyols other than the polyether polyol (a) may be used in an amount such that the effects produced by the use of the above specific polyol mixture are not substantially impaired. Such other polyether polyols are prepared, for instance, by addition polymerization of an alkylene oxide having at most 5 carbon atoms to an active hydrogen-containing compound as mentioned before in the presence of a catalyst, followed by purification to remove the catalyst.

The polyurethane resins obtained from the compositions of the present invention have an excellent water resistance and are suitable particularly for use in sealants, adhesives or paints.

The present invention is more specifically described and explained by means of the following Examples, in which all % and parts are by weight unless otherwise noted. It is to be understood that the present invention is not limited to these Examples.

In order to illustrate the preparation of polyether polyols, the following Reference Examples are also presented.

REFERENCE EXAMPLE 1

A 5 liter autoclave was charged with 92 parts of glycerol and 9 parts of potassium hydroxide. After replacing with nitrogen gas, 1,500 parts of nonene oxide was gradually added to the autoclave over 6 hours with stirring and with cooling to maintain the temperature at 100° C. The reaction was further conducted at 120° C. for 4 hours to complete the reaction. To the autoclave was then added 100 parts of synthetic magnesium silicate and the reaction product was treated at 120° C. for 5 hours. The reaction product was taken out and filtered with a glass filter to give 2,500 parts of the desired polyether polyol.

The obtained polyether polyol had a hydroxyl value of 56 mgKOH/g and an average molecular weight of 3,000 measured by a terminal group determination method.

Various polyether polyols were also prepared in the same manner as above using the active hydrogen-containing compounds and alkylene oxides shown in Table 1. The results are shown in Table 1.

TABLE 1

| No. | Active hydrogen compound kind | parts | Alkylene oxide (parts) Nonene oxide | $C_{12}$ olefin oxide | Propylene oxide | Ethylene oxide | Polyether polyol Average molecular weight | Proportion of $C_6$ or higher oxyalkylene group in the molecule |
|---|---|---|---|---|---|---|---|---|
| P-1 | Glycerol | 92 | 1500 | — | 1408 | — | 3000 | 50% |
| P-2 | Trimethylolpropane | 134 | 2100 | — | 466 | 300 | 3000 | 70% |
| P-3 | Glycerol | 92 | — | 3600 | 2008 | 300 | 6000 | 60% |
| P-4 | Sorbitol | 182 | — | 1200 | 4618 | — | 6000 | 20% |
| P-5 | Propylene glycol | 76 | 600 | — | 1324 | — | 2000 | 30% |
| P-6 | Diethylene glycol | 106 | 400 | — | 494 | — | 1000 | 40% |

REFERENCE EXAMPLE 2

Polyether polyols were prepared in the same manner as in Reference Example 1 except that ethylene oxide, propylene oxide and butylene oxide were used as the alkylene oxide.

The results are shown in Table 2.

TABLE 2

| No. | Active hydrogen compound kind | parts | Alkylene oxide (parts) Butylene oxide | Propylene oxide | Ethylene oxide | Polyether polyol Average molecular weight |
|---|---|---|---|---|---|---|
| C-1 | Glycerol | 92 | — | 2908 | — | 3000 |
| C-2 | Trimethylolpropane | 134 | 2100 | 466 | 300 | 3000 |
| C-3 | Glycerol | 92 | — | 5608 | 300 | 6000 |
| C-4 | Sorbitol | 182 | 1200 | 4618 | — | 6000 |
| C-5 | Propylene glycol | 76 | — | 1924 | — | 2000 |

EXAMPLE 1

The polyether polyol shown in Table 3 was dissolved in liquid paraffin. After dissolving triethylamine, 4,4'-diphenylmethane diisocyanate (MDI) was added thereto, and the mixture was uniformly admixed and allowed to stand.

The results are shown in Table 3.

TABLE 3

| Run No. | Polyether polyol kind | parts | 4,4'-Diphenylmethane diisocyanate (equivalent ratio) | Liquid paraffin (parts) | State of the mixture after allowing to stand |
|---|---|---|---|---|---|
| 1-1 | P-1 | 10 | 1.0 | 100 | uniform gellation |
| 1-2 | P-3 | 10 | 1.2 | 100 | uniform gellation |
| 1-3 | P-4 | 15 | 1.3 | 100 | uniform gellation |
| 1-4 | C-1 | 10 | 1.0 | 100 | white, separation |
| 1-5 | C-3 | 10 | 1.2 | 100 | white, separation |
| 1-6 | C-4 | 15 | 1.3 | 100 | white, separation |

It is observed in Table 3 that excellent gelled materials of aliphatic hydrocarbon compounds are obtained by the use of the particular polyether polyols according to the present invention.

The gel products according to the present invention were used as a gelled fuel and compared with an alcohol-containing gel commercially available as the pocket fuel. The gel products according to the present invention showed a larger quantity of heat generation and shape retention without melting during the burning.

EXAMPLE 2

A paraffin wax was added to each of the polyether polyols shown in Table 4. The mixture was heated to 75° C. and then cooled, and the state of the cooled mixture was observed.

The results are shown in Table 4.

TABLE 4

| No. | Polyether polyol kind | parts | Paraffin wax parts | Appearance |
|---|---|---|---|---|
| S-1 | P-1 | 100 | 10 | Opaque, but no separation into layers |
| S-2 | P-2 | 100 | 10 | " |
| S-3 | P-3 | 100 | 5 | Transparent, dissolution |
| S-4 | P-4 | 100 | 3 | " |
| S-5 | P-5 | 100 | 15 | " |
| S-6 | P-6 | 100 | 20 | " |
| S-7 | C-1 | 100 | 10 | Separation into layers |
| S-8 | C-2 | 100 | 15 | " |
| S-9 | C-3 | 100 | 5 | " |
| S-10 | C-4 | 100 | 3 | " |
| S-11 | C-5 | 100 | 20 | " |

The above mixture of polyether polyol and wax was admixed with a polyisocyanate and additives according to the formulation shown in Table 5 at 25° C. The resulting mixture was then subjected to a foaming test in an aluminum mold (40° C.) without applying a mold releasing agent, provided that when the mixture separated into layers, only the clear portion was used for the test.

TABLE 5

| Ingredients | Parts |
|---|---|
| Polyether polyol/wax mixture | 100 |
| Toluene diisocyanate 80 (product of Mitsubishi Chemical Industries Ltd.) | (INDEX) 100 |
| Water | 3.5 |
| Silicone oil SH194 (product of Toray Silicone Kabushiki Kaisha) | 1.5 |
| Dabco (trade mark) made by FOUDRY PROCESS CO., LTD. | 0.1 |
| Stannous octoate | 0.08 |

The foaming test was conducted by uniformly mixing the ingredients other than toluene diisocyanate, adding toluene diisocyanate, mixing for 4 seconds by a homomixer, pouring the resulting mixture to an aluminum box as a mold (thickness 5 mm, inner volume 8 liters) maintained at 40° C., and immediately covering the box. After the completion of the foaming, the mold was placed in a steam oven at 120° C. for 60 minutes, and after taking out the mold from the oven, the cover of the mold was taken off and the foamed product was released from the mold.

The state of release from the mold was shown in Table 6.

TABLE 6

| Run No. | Polyether polyol/ wax mixture | Release of foam from mold |
|---|---|---|
| 2-1 | S-1 | releasable |
| 2-2 | S-3 | " |
| 2-3 | S-4 | " |
| 2-4 | S-7 | unreleasable due to sticking to mold |
| 2-5 | S-9 | unreleasable due to sticking to mold |
| 2-6 | S-10 | unreleasable due to sticking to mold |

From the results shown in Table 6, it would be understood that the paraffin wax included in the polyether polyol serves as an internal releasing agent for release of the polyurethane foam from the mold. Like this, an excellent result of the present invention is observed.

EXAMPLE 3

The polyether polyol shown in Table 7 was dissolved in a polyalkylene polyol (polybutadiene having hydroxyl groups at the ends and having a 1,4-bond content of 80% and an OH value of 46.5 mgKOH/g, commercially available under the trademark "Poly bd R-45HT" made by ARCO CHEMICAL CO., LTD.). After further dissolving triethylamine in the mixed polyol, 4,4'-diphenylmethane diisocyanate (MDI) was added to the mixed polyol. The mixture was uniformly admixed and then allowed to stand.

The results are shown in Table 7.

TABLE 7

| Run No. | Polyether polyol kind | parts | Polyalkylene polyol (Poly bd R-45HT) (parts) | 4,4'-Diphenylmethane diisocyanate (equivalent ratio) | State of the mixture after allowing to stand |
|---|---|---|---|---|---|
| 3-1 | P-1 | 40 | 60 | 1.0 | uniform gellation |
| 3-2 | P-3 | 60 | 40 | 1.2 | uniform gellation |
| 3-3 | P-4 | 80 | 20 | 1.3 | uniform gellation |
| 3-4 | C-1 | 40 | 60 | 1.0 | white, separation |
| 3-5 | C-3 | 60 | 40 | 1.2 | white, separation |
| 3-6 | C-4 | 80 | 20 | 1.3 | white, separation |

It is observed in Table 7 that the particular polyether polyols according to the present invention provide uniform polyurethane products in spite of the combination use with hydroxy-terminated polybutadiene.

EXAMPLE 4

The hydroxy-terminated polybutadiene "Polyol bd R-45HT" was added to each of the polyether polyols shown in Table 8. The mixture was heated to 75° C. and then cooled, and the state of the cooled mixture was observed.

The results are shown in Table 8.

TABLE 8

| No. | Polyether polyol kind | parts | Poly bd R-45HT parts | Appearance |
|---|---|---|---|---|
| S-12 | P-1 | 100 | 10 | Opaque, but no separation into layers |
| S-13 | P-2 | 100 | 10 | " |
| S-14 | P-3 | 100 | 30 | Transparent, dissolution |
| S-15 | P-4 | 100 | 30 | " |
| S-16 | P-5 | 100 | 60 | " |
| S-17 | P-6 | 100 | 60 | " |
| S-18 | C-1 | 100 | 10 | Separation into layers |
| S-19 | C-2 | 100 | 10 | " |
| S-20 | C-3 | 100 | 30 | " |
| S-21 | C-4 | 100 | 50 | " |
| S-22 | C-5 | 100 | 60 | " |

The above mixture of polyether polyol and hydroxy-terminated polybutadiene was reacted with an excess amount of toluene diisocyanate (TDI) at 100° C. for 3 hours with stirring to prepare a prepolymer having a free isocyanate content of 3.5 to 4.0%.

By using the thus obtained prepolymer, a sheet-like polyurethane resin was prepared according to the formulation shown in Table 9 and allowed to stand for a week.

TABLE 9

| Ingredients | parts |
|---|---|
| Component A | |
| Prepolymer having a free NCO content of 3.5 to 4.0% | 50 |
| Component B | |
| 4,4'-Diaminodiphenylmethane ("MOCA") made by Ihara Chemical Industry Co., Ltd.) | 3.7 |
| Polyol having an OH value of 56.1 mg KOH/g ("Polyhardner T300" made by DAI-ICHI KOGYO SEIYAKU CO., LTD.) | 12.0 |
| DOP | 11.8 |
| Liquid resin ("KE-850" made by Nippon Petrochemicals Co., Ltd.) | 13.0 |
| Calcium carbonate ("NS #1000" made by Nitto Funka Kogyo Kabushiki Kaisha) | 51.5 |
| Gray pigment Nikka Octics Lead (trademark) made by Nippon Kagaku Sangyo Kabushiki Kaisha, 20% concentration | 5.0 |
| Antifoaming agent | 1.5 |
| Total | 1.5 |
| | 100 |

Mixing ratio Component A:Component B = 1:2

The obtained polyurethane resin was immersed in 1N HCl at 50° C. for two weeks. The physical properties of the polyurethane resin were measured before and after the immersion according to JIS A 6021.

The results are shown in Table 10.

TABLE 10

| | | Physical properties of polyurethane resin | | | | | |
|---|---|---|---|---|---|---|---|
| | | Just after preparation | | | After immersion in 1 N HCl for 2 weeks | | |
| Run No. | Polyol | Shore A hardness | Tensile strength (kg/cm$^2$) | Elongation (%) | Shore A hardness | Tensile strength (kg/cm$^2$) | Elongation (%) |
| 4-1 | S-12 | 55 | 40 | 780 | 54 | 41 | 770 |
| 4-2 | S-13 | 57 | 42 | 740 | 55 | 40 | 800 |
| 4-3 | S-14 | 45 | 75 | 900 | 44 | 75 | 880 |
| 4-4 | S-15 | 30 | 35 | 1020 | 28 | 33 | 1060 |
| 4-5 | S-18 | 56 | 41 | 700 | 26 | 10 | 200 |
| 4-6 | S-19 | 57 | 43 | 720 | 15 | 5 | 120 |
| 4-7 | S-20 | 42 | 70 | 850 | 18 | 20 | 250 |
| 4-8 | S-22 | 29 | 30 | 950 | 10 | 5 | 300 |

From the results shown in Table 10, it would be apparent that the polyurethane resins prepared according to the present invention are very excellent in chemical resistance and water resistance.

In addition to the ingredients used in the Examples, other ingredients can be used in the Examples as set forth in the specification to obtain substantially the same results.

What we claim is:

1. A polyurethane resin composition containing a polyurethane resin and an aliphatic hydrocarbon component, said composition being obtained by subjecting to reaction a mixture comprising:
   (A) a polyether polyol having at least 10% by weight of units of an alkylene oxide having 6 or more carbon atoms, or a mixture of said polyether polyol and a polyether polyol which does not have at least 10% by weight of units of an alkylene oxide having 6 or more carbon atoms, and
   (B) an organic polyisocyanate compound, in the presence of
   (C) an aliphatic hydrocarbon component.

2. The composition of claim 1, wherein said polyether polyol which does not have at least 10% by weight of units of an alkylene oxide having 6 or more carbon atoms is a polyoxyalkylene polyol prepared from an alkylene oxide having 5 or less carbon atoms.

3. The composition of claim 1, wherein said aliphatic hydrocarbon component consists essentially of a member selected from the group consisting of a petroleum fraction, a polyethylene wax, an α-olefin polymer and a liquid polybutadiene.

4. The composition of claim 1, wherein the amount of said aliphatic hydrocarbon component is from 1 to 1,500 parts by weight per 100 parts by weight of said component (A).

5. The composition of claim 1, wherein the amount of said aliphatic hydrocarbon component is from 40 to 1,100 parts by weight per 100 parts by weight of said component (A).

* * * * *